US010804972B2

(12) United States Patent
Wahlberg et al.

(10) Patent No.: US 10,804,972 B2
(45) Date of Patent: Oct. 13, 2020

(54) PERSONAL ON-THE-MOVE SATELLITE COMMUNICATIONS TERMINAL

(71) Applicant: OverHorizon AB, Solna (SE)

(72) Inventors: Per Wahlberg, Nacka (SE); Martin Eriksson, Solna (SE); Kennet Lejnell, Ekero (SE)

(73) Assignee: OVERHORIZON AB, Solna (SE)

( * ) Notice: Subject to any disclaimer, the term of this patent is extended or adjusted under 35 U.S.C. 154(b) by 0 days.

(21) Appl. No.: 16/447,059

(22) Filed: Jun. 20, 2019

(65) Prior Publication Data

US 2019/0393930 A1    Dec. 26, 2019

Related U.S. Application Data

(60) Provisional application No. 62/687,603, filed on Jun. 20, 2018.

(51) Int. Cl.
*H04L 7/027* (2006.01)
*H04B 7/02* (2018.01)
(Continued)

(52) U.S. Cl.
CPC ............ *H04B 7/028* (2013.01); *G08C 17/02* (2013.01); *H01Q 3/08* (2013.01); *H04B 7/18517* (2013.01)

(58) Field of Classification Search
CPC .... H04B 7/028; H04B 7/18517; H01Q 1/125; H01Q 3/02; H01Q 3/08; G08C 17/02
See application file for complete search history.

(56) References Cited

U.S. PATENT DOCUMENTS 4,345,256 A    8/1982  Rainwater
5,398,035 A    3/1995  Densmore et al.
(Continued)

FOREIGN PATENT DOCUMENTS

EP    1764933 A1    3/2007
JP    62-084604     4/1987
(Continued)

OTHER PUBLICATIONS

International Preliminary Report on Patentability and Written Opinion issued in International Application No. PCT/US2006/049417 dated Jul. 1, 2008 (6 pages).
(Continued)

*Primary Examiner* — David S Huang
(74) *Attorney, Agent, or Firm* — White & Case LLP

(57) ABSTRACT

A satellite communications apparatus including an antenna assembly having: a directional antenna arranged to receive signals from and transmit signals to a satellite, an electronic motor arranged to adjust at least one of a position and orientation of the directional antenna; and a sensor arranged to detect the position and orientation of the directional antenna. An RF interface, in communication with the antenna, is arranged to receive the received signals from the directional antenna. A controller, in communication with the RF interface, is arranged to: i) measure a gain associated with the received signals during a first time interval, ii) receive the detected position and orientation of the directional antenna during the first time interval, and iii) send a control signal to the electronic motor to adjust the position and orientation of the directional antenna to limit a decrease in the measured gain to less than a threshold.

20 Claims, 9 Drawing Sheets

(51) Int. Cl.
*G08C 17/02* (2006.01)
*H01Q 3/08* (2006.01)
*H04B 7/185* (2006.01)

(56) References Cited

U.S. PATENT DOCUMENTS

| | | | |
|---|---|---|---|
| 5,517,205 A * | 5/1996 | van Heyningen | H01Q 1/18 248/183.1 |
| 6,538,612 B1 | 3/2003 | King | |
| 6,653,981 B2 | 11/2003 | Wang et al. | |
| 7,173,571 B2 | 2/2007 | Webb et al. | |
| 7,542,716 B2 | 6/2009 | Bell et al. | |
| 7,705,793 B2 | 4/2010 | Kaplan et al. | |
| 8,248,318 B2 | 8/2012 | Wahlberg et al. | |
| 8,786,506 B2 * | 7/2014 | Ayotte | H01Q 1/08 343/702 |
| 2002/0093451 A1 | 7/2002 | Harmon et al. | |
| 2005/0259021 A1 | 11/2005 | Stoyanov et al. | |
| 2007/0001920 A1 | 1/2007 | Webb et al. | |
| 2007/0135040 A1 | 6/2007 | Draim | |
| 2008/0018545 A1 | 1/2008 | Kaplan et al. | |
| 2011/0076956 A1 | 3/2011 | Tronc et al. | |
| 2011/0105126 A1 | 5/2011 | Liang et al. | |
| 2011/0317665 A1 | 12/2011 | Jung et al. | |
| 2014/0045420 A1 | 2/2014 | Tong et al. | |
| 2016/0126625 A1 * | 5/2016 | Gurewitz | H01Q 3/02 342/353 |
| 2017/0047653 A1 | 2/2017 | Runyon et al. | |
| 2017/0085314 A1 | 3/2017 | Davis | |
| 2018/0248676 A1 * | 8/2018 | Raggio | H04L 5/14 |
| 2019/0326982 A1 * | 10/2019 | Darby, III | H04W 24/02 |

FOREIGN PATENT DOCUMENTS

| | | |
|---|---|---|
| JP | 09-153718 | 6/1997 |
| JP | 10-178313 | 6/1998 |
| JP | 2001-0077637 | 3/2001 |
| WO | WO-2004073229 | 8/2004 |
| WO | WO-2007064094 | 6/2007 |
| WO | WO-2007067016 | 6/2007 |

OTHER PUBLICATIONS

Combined International Search Report and Written Opinion for PCT/EP2014/000391, dated Apr. 23, 2014 (10 pages).
International Preliminary Report on Patentability and Written Opinion issued in International Patent Application No. PCT/EP2008/007548 dated Mar. 16, 2010.
Combined International Search Report and Written Opinion for PCT/EP2019/066420, dated Sep. 19, 2019 (170 pages).

* cited by examiner

PERSONAL ON-THE-MOVE SATELLITE COMMUNICATIONS TERMINAL

REFERENCE TO RELATED APPLICATIONS

This application claims priority to and the benefit of U.S. Provisional Patent Application No. 62/687,603, filed on Jun. 20, 2018, and entitled "Personal On-the-Move Satellite Communications Terminal," the entire contents of which are incorporated herein by reference.

FIELD OF THE DISCLOSURE

The disclosure relates generally to communications systems. More particularly, in various aspects, the disclosure relates to on-the-move satellite communications devices.

BACKGROUND

A satellite terminal on Earth must stay pointed towards the desired satellite in order to maintain a communications link. Terminals that are operated on-the-move must therefore be continuously repointed by mechanical, electrical or other means as they change position relative to the satellite. Terminal integration in vehicles such as cars, boats and airplanes typically makes use of fairly large, flat surfaces on the vehicles for the terminal outdoor unit (antenna, radome, LNB and pointing platform) whilst integrating the indoor unit (amplifier, modem, power supply) inside the vehicle. The indoor unit is therefore protected and typically bulky, heavy and not for outdoor use.

A personal on-the-move terminal may be carried by a user, and arranged such that the user has both hands free. Existing products are available at low frequencies (L-band) where the antenna is omni or semi-omni directional and supports links in the Kbps range. Such antennas are typically rigidly mounted to the top of a pole that is attached to a backpack. One significant problem with these systems is the low data rates that prevent them from supporting data intensive applications such as live streaming of video. Another significant problem is the positioning of the antenna which, in order to safeguard the health of the person carrying the antenna, has to be mounted such that the radiation is directed upwards when the person is standing up. This can result in a dangerous situation where, if the person carrying the terminal lies down, the antenna will direct its energy horizontally, and hence will miss the targeted satellite, but can radiate into another person lying beside the first person.

Accordingly, there is a need for a less cumbersome, less bulky, less hazardous, and more maneuverable on-the-move satellite terminal.

SUMMARY

The application, in various aspects, addresses the deficiencies associated with enabling less cumbersome, safer, more maneuverable, and more reliable satellite communications using a portable and/or on-the-move satellite terminal.

The systems, apparatuses, and methods described herein support data streams with rates higher than 0.5 Mbps on an uplink and downlink, while limiting the antenna system and/or satellite terminal to a manageable size as personal gear that can be carried by a user. In various implementations, the terminal, by using higher frequencies, using a directional antenna that is extendable away from a carrying user, and using a stabilized platform mounted on the user in a similar way as a backpack enables a less cumbersome, less bulky, less hazardous, and more maneuverable on-the-move personal and/or portable satellite terminal.

In one aspect, a satellite communications apparatus includes an antenna assembly having: a directional antenna arranged to receive signals from and transmit signals to a satellite, an electronic motor arranged to adjust at least one of a position and orientation of the directional antenna; and a sensor arranged to detect the position and orientation of the directional antenna. The apparatus also includes an RF interface, in communication with the antenna, arranged to receive the received signals from the directional antenna. The apparatus includes a controller, in communication with the RF interface, that is arranged to: i) measure a gain associated with the received signals during a first time interval, ii) receive the detected position and orientation of the directional antenna during the first time interval, and iii) send a control signal to the electronic motor to adjust the position and orientation of the directional antenna to limit a decrease in the measured gain to less than a threshold.

The gain may include a power gain and/or amplitude gain. The threshold may be equal to or about one of 0.25 dB, 0.5 dB, 1 dB, 2 dB, 3 dB, 4 dB, and 5 dB. In one implementation, the electronic motor includes a servomotor. In some configurations, the antenna assembly includes a stabilized platform. The antenna assembly may be configured to provide pointing accuracy of one of about +/−1 degree, +/−2 degrees, +/−3 degrees, +/−4 degrees, and +/−5 degrees.

In some configurations, the apparatus is configured to be carried by a user. The directional antenna may be extendable away from the user. The directional antenna may be extendable to a distance sufficient to reduce RF radiation exposure to the user below a radiation limit. The controller may be configured to adjust the power output from the RF interface and/or the position and orientation of the directional antenna based on a presence of a person in proximity to the directional antenna. The time interval may be equal to or about one of 1 ms, 50 ms, 100 ms, 0.5 seconds, 1 second, 2 seconds, 5 seconds, 10 seconds, 30 seconds, 1 minute, 5 minutes, 10 minutes, and 1 hour. The duration of the time interval may be based at least in part on a detected rate of movement of the terminal. For instance, if the terminal is stationary, a time interval of a longer duration may be selected. If the terminal is moving, a time interval having a shorter duration may be selected to ensure the satellite pointing accuracy is maintained.

In another aspect, a method for satellite communications includes: providing an antenna assembly; configuring a directional antenna to receive signals from and transmit signals to a satellite; adjusting an electronic motor to adjust at least one of a position and orientation of the directional antenna; detecting the position and orientation of the directional antenna; receiving the received signals from the directional antenna; measuring a gain associated with the received signals during a first time interval; receiving the detected position and orientation of the directional antenna during the first time interval; and sending a control signal to the electronic motor to adjust the position and orientation of the directional antenna to limit a decrease in the measured gain to less than a threshold.

A further aspect includes a non-transient computer readable medium containing program instructions for causing a computer to perform the method of: configuring a directional antenna to receive signals from and transmit signals to a satellite; adjusting an electronic motor to adjust at least one of a position and orientation of the directional antenna; detecting the position and orientation of the directional antenna; receiving the received signals from the directional antenna; measuring a gain associated with the received signals during a first time interval; receiving the detected position and orientation of the directional antenna during the first time interval; and sending a control signal to the electronic motor to adjust the position and orientation of the directional antenna to limit a decrease in the measured gain to less than a threshold.

DRAWINGS

The foregoing and other objects and advantages of the disclosure will be appreciated more fully from the following further description thereof, with reference to the accompanying drawings. The skilled person in the art will understand that the drawings, described below, are for illustration purposes only. The drawings are not included to limit the scope of the applicant's teaching in any way.

FIG. 1 includes a diagram of a communications system between one or more satellites and a portable satellite communications terminal;

FIG. 2 includes a functional block diagram of a satellite terminal;

FIG. 3 includes a functional block diagram of a computer system;

DETAILED DESCRIPTION

In the proposed disclosure, it is possible to support data streams with rates higher than 0.5 Mbps on an uplink and downlink, while restricting the antenna system to a manageable size, for personal gear, by use of higher frequencies, a directional antenna and a stabilized platform that is mounted on a person in a similar way as a backpack and, in one version, forms an integral part of a normal backpack.

Figure 1:
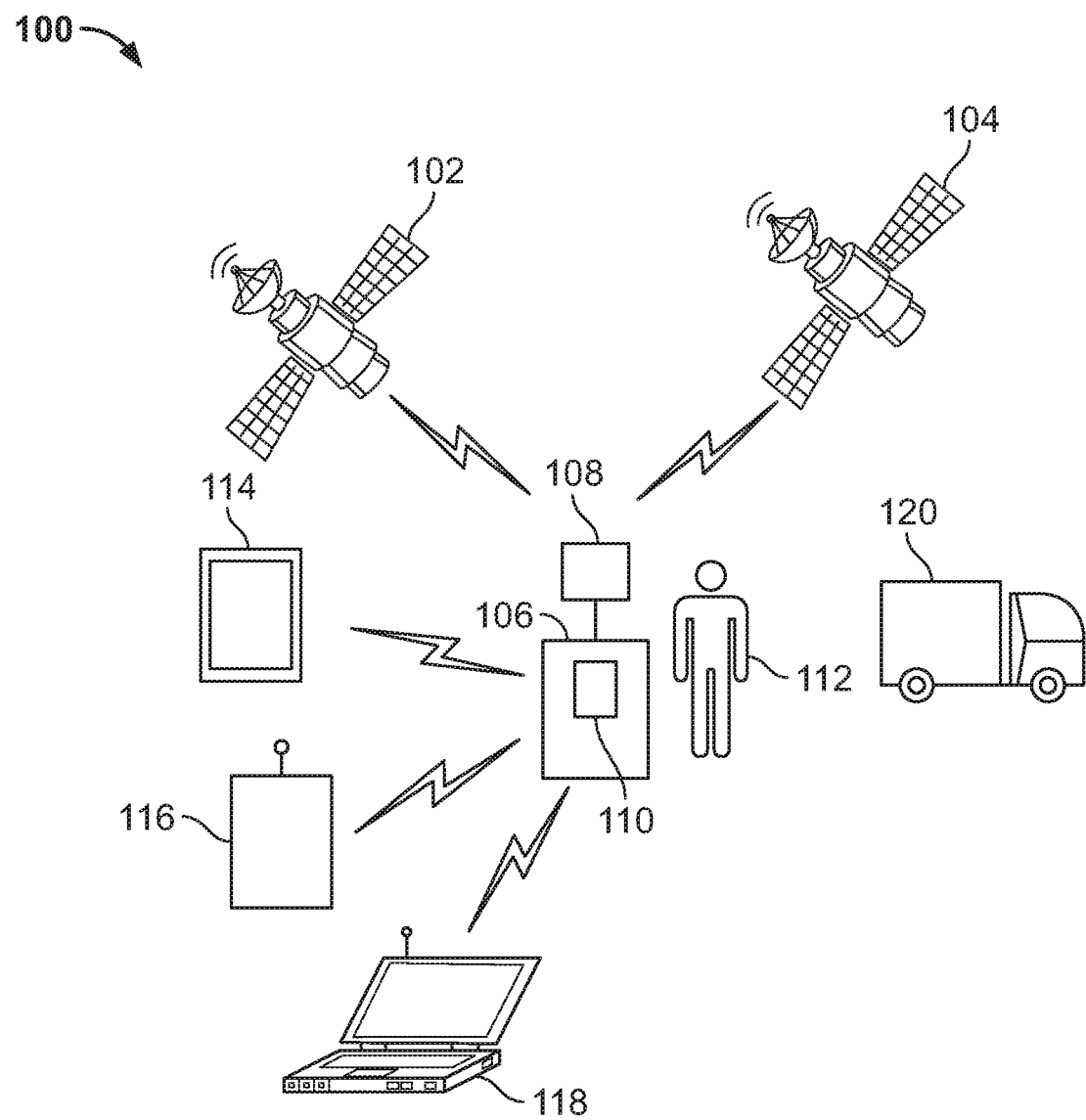

FIG. 1 includes a diagram of a communications system 100 between one or more satellites 102 and 104 and a portable and/or on-the-move satellite communications terminal 106. The terminal 106 may be carried by a user 112. The terminal 106 may include a satellite antenna assembly 108 arrange to transmit and/or receive data from the one or more satellites 102 and 104. The terminal 106 may include a second wireless transceiver 110 arranged to provide wireless communications between the terminal 106 and one or more wireless communications devices such as, for example, a computer tablet 114, a mobile telephone 116, and/or a personal computer 118. The terminal 106 may be integrated with a backpack and/or configured to be carried like a backpack by the user 112. The terminal 106 may be detachably-connectable to a land, sea, or air vehicle such as, for example, truck 120.

When ready to transmit, the user 112 slides up an antenna using, for example, an outer mount plate and harness of the antenna assembly 108. In a stowed position, the antenna of antenna assembly 108 slides down behind the back of the user 112 for protection and reduced visibility. When the antenna is in the elevated position, which may extend above the carrying person's or user's head, the terminal 106 will start a search algorithm to identify the satellite 102 or 104 which has been chosen in the control unit and/or processor of the terminal 106. When the satellite 102 or 104 has been identified, a stabilized pointing mechanism of antenna assembly 108 will lock onto the target satellite signal and maintain this pointing, also when the user 112 and/or terminal 106 are in motion.

Figure 2:
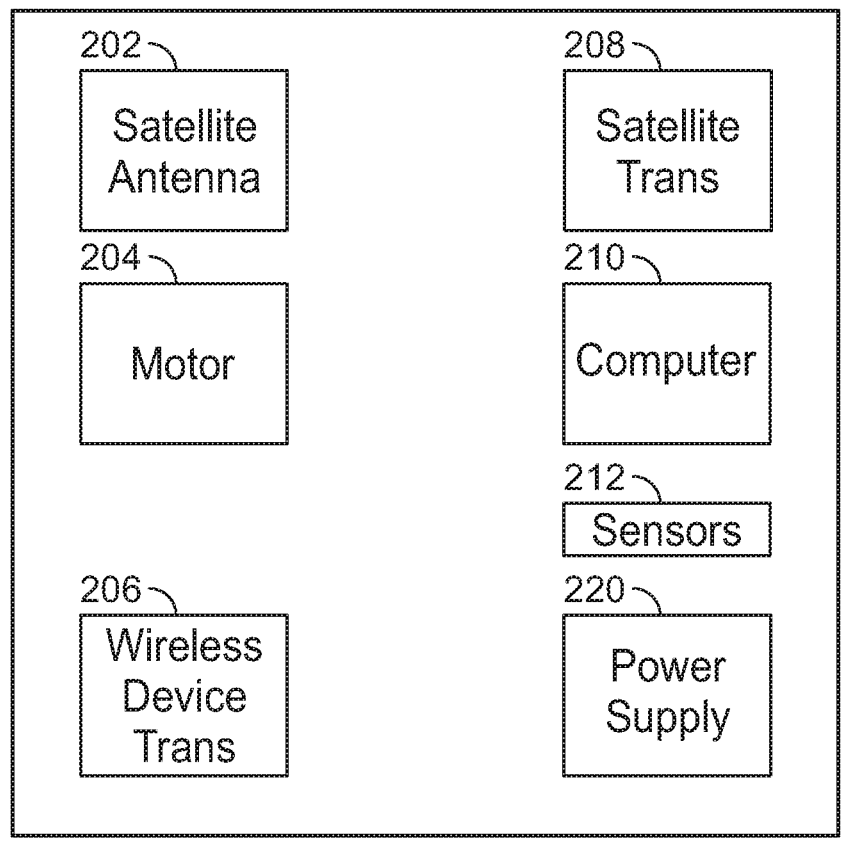

FIG. 2 includes a functional block diagram of a satellite terminal 200. The terminal 200 may include a satellite antenna 202, an antenna motor 204, a wireless device transceiver 206, a satellite transceiver 208, one or more sensors 212, a computer and/or processor 210, and a power supply 220.

The terminal 200 and/or 106 may be powered via replaceable batteries configured to be swapped out for fresh and/or more fully charged ones during operation. The terminal 200 and/or 106 may be powered by connecting to an AC power source that, in some configurations, will then charge one or more batteries of power supply 220, and enable transmission of data signals to and/from the terminal 200 and/or 106.

The wireless device transceiver 206 and/or 110 may support one or more wireless communications interfaces and/or protocols such as, without limitation, 802.11 and/or Wifi, CDMA, GSM, GPRS, LTE, Bluetooth, and any other standard wireless communications interface, For example, the wireless device transceiver 206 may include a Wifi module that enables smartphones, tablets, computers and other Wifi units to connect to the terminal 200 and/or 106 and communicate via the satellite 102 and/or 104 to other units and or gateways with Internet connectivity. The terminal 200 and/or 106 may also include a converter unit that takes signals from handheld communication radios and transmits them via the terminal 200 and/or 106. For example, the wireless device transceiver 206 may send and receive data to/from a mobile telephone 116 while also performing a conversion and/or transcoding of the data with the satellite transceiver and/or RF interface 208 to enable the terminal 200 and/or 106 to send and receive data to/from satellite 102 and/or 104. This advantageously allows for an expansion of a local radio network via the satellite link to other networks that employ the same system but are located beyond line of sight.

The antenna assembly 108 may include a higher frequency and directional antenna 202 that enables higher throughput data rates. Also, when the antenna assembly 108 uses a stabilized platform, it is possible to keep the antenna 202 and/or terminal 200 pointed towards the target satellite 102 or 104 even when the person or user 112 is lying down. Another advantage of having the stabilized platform is that it can also be used on different kinds of vehicles such as, without limitation, bikes, motorcycles, ski mobiles, jet skis, and so on. The terminal 200 and/or 106 may be detachably connectable to a vehicle by means of a quick mount, e.g. a magnetic strap-on functionality or a quick mount click on to a roof bar system. In some implementations, the terminal 200 and/or 106 is mounted on the roof of a vehicle such as a car (e.g. lying flat on the roof) and so on. In certain configurations, the terminal 200 and/or 106 includes an integrated tri-pod assembly and/or functionality that can also be used to position terminal 200 and/or 106 down on ground or another surface where the unit can be used for communications on-the-pause. The power supply 220 and/or satellite transceiver 208 may be flexibly designed to scale for different power levels by including a more or less powerful transceiver 208 amplifier and accompanying power supply 220.

Figure 3:
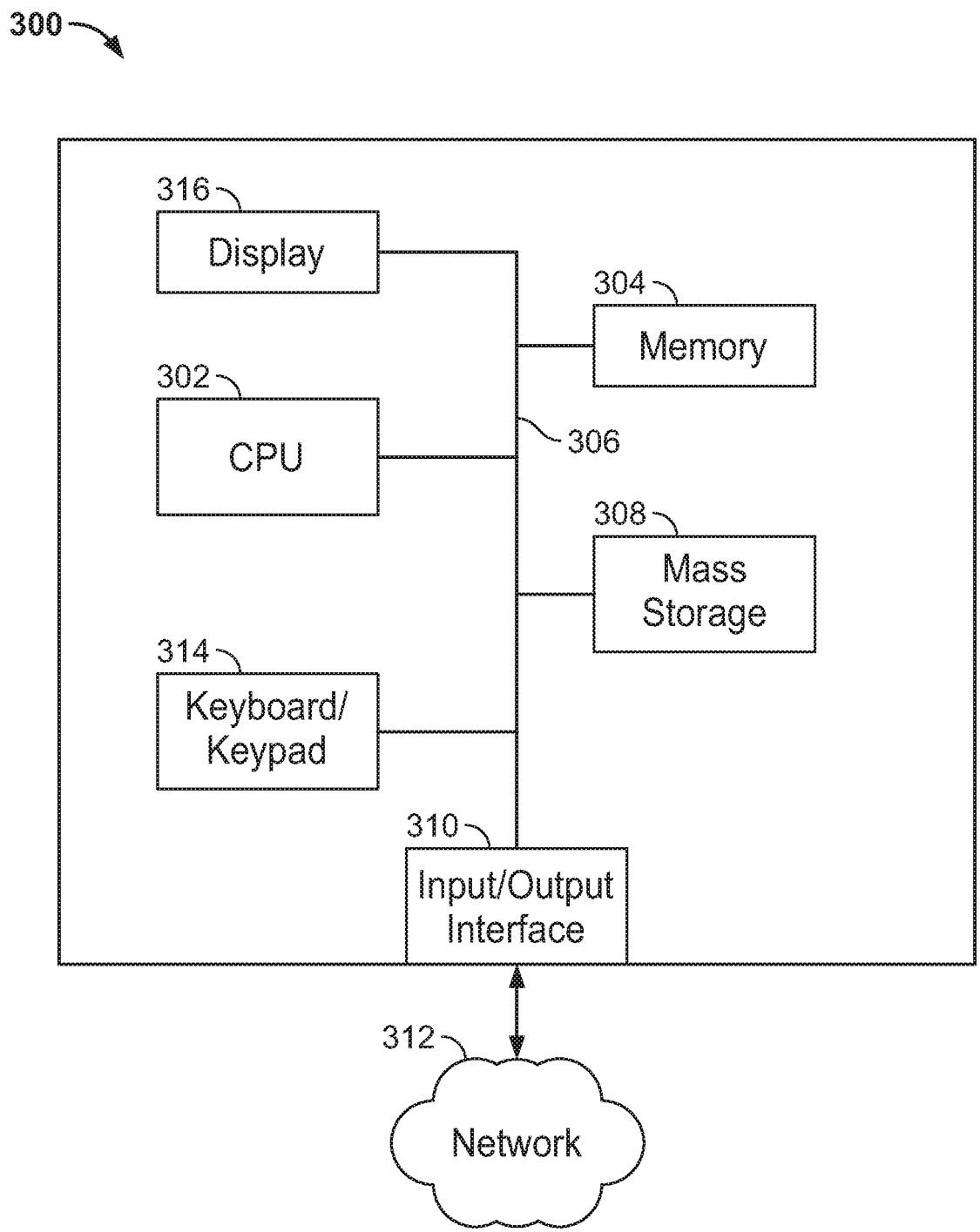

FIG. 3 includes a functional block diagram of a computer system 300 and/or control unit associated with a satellite terminal 200 and/or 106 according to the present disclosure. The exemplary terminal computer system 300 includes a processor 302, a memory 304, an interconnect bus 306, a display 316, a keyboard/keypad 314, mass storage 308, and an input/output interface 310. The processor 302 may include a single microprocessor or a plurality of microprocessors for configuring computer system 300 as a multiprocessor system. The memory 304 illustratively includes a main memory and a read-only memory. The system 300 also includes the mass storage device 310 having, for example, various disk drives, solid state drives, tape drives, and so on. The main memory 304 may also include dynamic random access memory (DRAM) and high-speed cache memory. In operation and use, the main memory 304 stores at least portions of instructions for execution by the processor 302 when processing data (e.g., terminal location and/or one or more satellite positions and/or orientations) and executing control instructions (i.e., control software) stored in main memory 304.

In some aspects, the system 300 may also include one or more input/output interfaces for communications, shown by way of example, as interface 310 for data communications via a network 312, e.g., a satellite communications network. The data interface 310 may include one or more modems, one or more electronic transceivers, a satellite communications interface, and/or any other suitable data communications device. The data interface 310 may provide a relatively high-speed link to a network, such as an intranet, internet, or the Internet, either directly or through another external interface. The data interface 310 may include an interface to a remote control device. The data interface 310 may include one or more wireless interfaces to one or more portable computing devices (e.g., mobile phone, iPad, computer tablet, and so on) to facilitate communications between the one or more computing devices and a satellite network.

In some implementations, the data interface 310 includes a Wifi hotspot, cellular base station interface, Bluetooth terminal, and/or wireless data link to a satellite network that may enable communications between such computing devices and other data networks such as the Internet. The communications link to the wireless and/or satellite network may include, for example, any suitable link such as an optical, wired, or wireless (e.g., via satellite or 802.11 Wi-Fi or cellular network) link. In some aspects, the computer system 300 may include an operating system and/or computer applications and/or software capable of web-based communications via a network connected to the terminal. In some aspects, the system 300 also includes suitable input/output ports or may use the Interconnect Bus 306 for interconnection with a local display 316 and user interface 314 (e.g., keyboard, mouse, touchscreen) or the like serving as a local user interface for programming and/or data entry, retrieval, video display, and/or manipulation purposes. Alternatively and/or additionally, remote operations personnel may interact with the system 300 for controlling and/or programming the system from remote servers and/or devices (not shown in the Figure) via one or more wireless networks connected to the terminal.

In some aspects, the system includes a processor 302, such as a communications controller, coupled to one or more sensors 212. The one or more sensors 212 may enable the terminal 200 and/or 106 to detect and/or track the position of one or more satellites 102 and/or 104 for communications. The sensors 212 may include one or more RF radiation sensors configured to measure RF radiation levels in proximity to the terminal 200 and/or one or more antennae 202 of the terminal 200. The sensors 212 may include one or more proximity sensors arranged to detect the location of a person or user 112 in proximity of an antenna 202. In response to measured or estimated radiation levels, the processor and/or controller 302 may adjust an orientation and/or power output of one or more antennae 202 in relation to a position of a user 112 and/or person carrying and/or in close proximity to the terminal 200 and/or 106. Data corresponding to terminal location, interfacing satellite positions, rate of movement, and so on associated with the terminal 200 and/or 106 may be stored in the memory 304 or mass storage 308, and may be retrieved by the processor 302. Processor 302 may execute instructions stored in these memory devices to perform any of the methods described in this application, e.g., tracking of satellites, extending or retracting antennae, and/or repositioning of one or more antennae 202 of the terminal 200 and/or 106 to optimize beam orientation.

The system may include a display 316 for displaying information, a memory 304 (e.g., ROM, RAM, flash, etc.) for storing at least a portion of the aforementioned data, and a mass storage device 308 (e.g., solid-state drive) for storing at least a portion of the aforementioned data. Any set of the aforementioned components may be coupled to a wireless communications network (satellite, 802.11 and/or Wifi, Bluetooth, cellular, and so on) via the input/output (I/O) interface 310. Each of the aforementioned components may communicate via interconnect bus 206. The system 300 may not include all of the components described in FIG. 3 depending on the functions of the terminal 200 and/or 106.

Figure 4A:
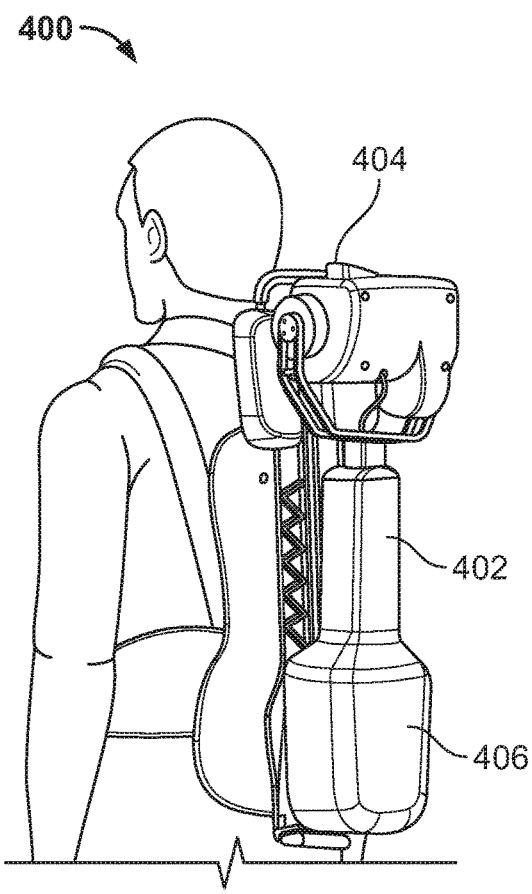
FIG. 4A is a first view of a portable satellite terminal positioned on a person's back.
Figure 4B:
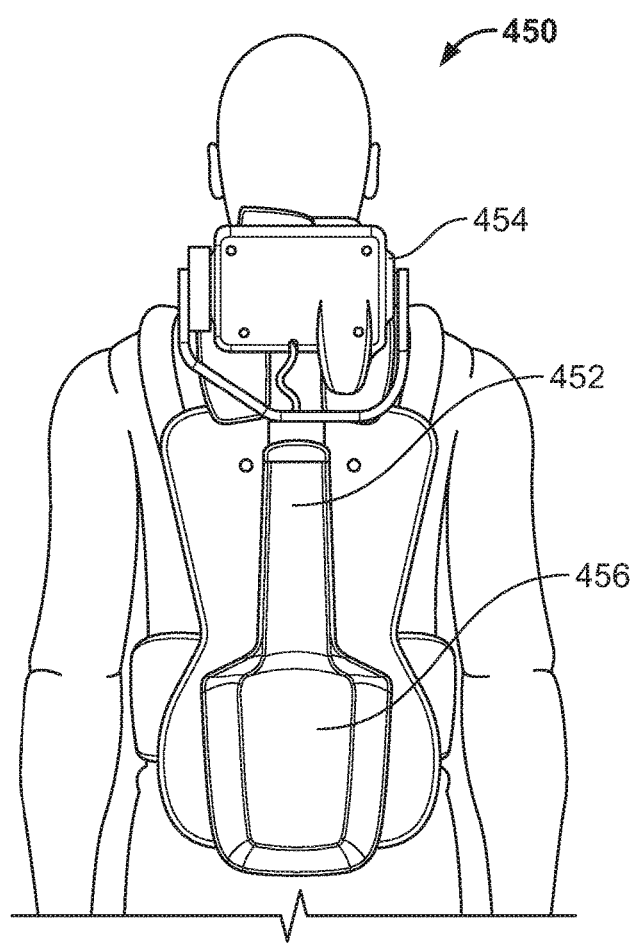
FIG. 4B is a second view of a portable satellite terminal positioned on a person's back.

FIGS. 4A and 4B show a first view 400 and a second view 450 of a portable satellite terminal 402 and 452 respectively positioned on a person's back. The terminal 402 includes a terminal housing and/or body arranged to house one or more system components such as described with respect to FIGS. 2 and 3. The terminal 402 also includes an extendable and/or retractable antenna 404. The terminal 452 includes a terminal housing and/or body includes a terminal housing and/or body arranged to house one or more system components such as described with respect to FIGS. 2 and 3. The terminal 452 also includes an extendable and/or retractable antenna 454. FIGS. 4A and 4B show the terminal 402 and/or 452 in the retracted position and/or storage position while the terminal is being carried on the back of user 112. In one implementation, the terminal 402 and/or 452 includes an integrated backpack harness to enable user 112 to carry the terminal 402 or 452. In certain implementations, the antenna 404 and body 406 (which may house the satellite transceiver and/or modem 208, computer 210, sensors 212, wireless device transceiver and/or modem 206, motor 204, power supply 220, and other control electronics) are elevated as one unit. In other embodiments, one or more of the components of terminal 200 are elevated, while other components remain in a housing that is not elevated. In some configurations, the terminal 200 includes multiple motors 204 to enable horizontal and/or vertical pointing and/or tilting of the satellite antenna 202. The motor(s) 204 may include an electromechanical motor such as a servomotor.

Figure 5A:
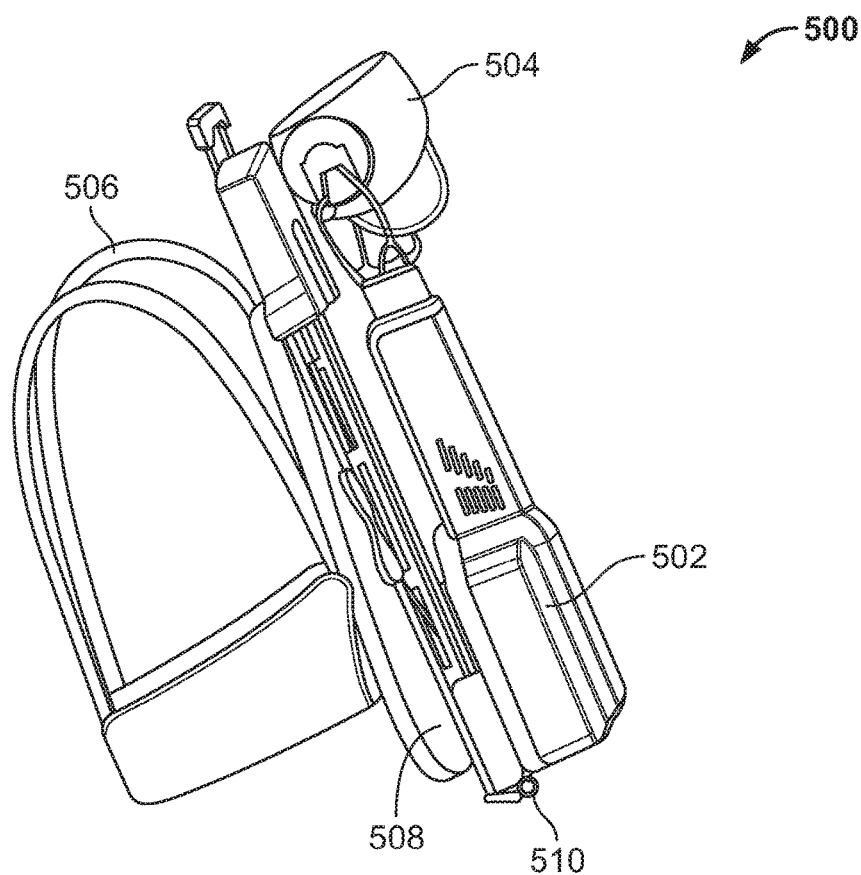
FIG. 5A is a view of the portable satellite terminal of FIG. 4A or 4B while resting on a surface.

FIG. 5A is a view 500 of the portable satellite terminal 402 or 452 of FIG. 4A or 4B while resting on a surface. As illustrated in FIG. 5A, the harness 506 and a support end block element 510 may function as an integrated tri-pod to enable the terminal 402 or 452 to rest in a stable manner on a surface.

Figure 5B:
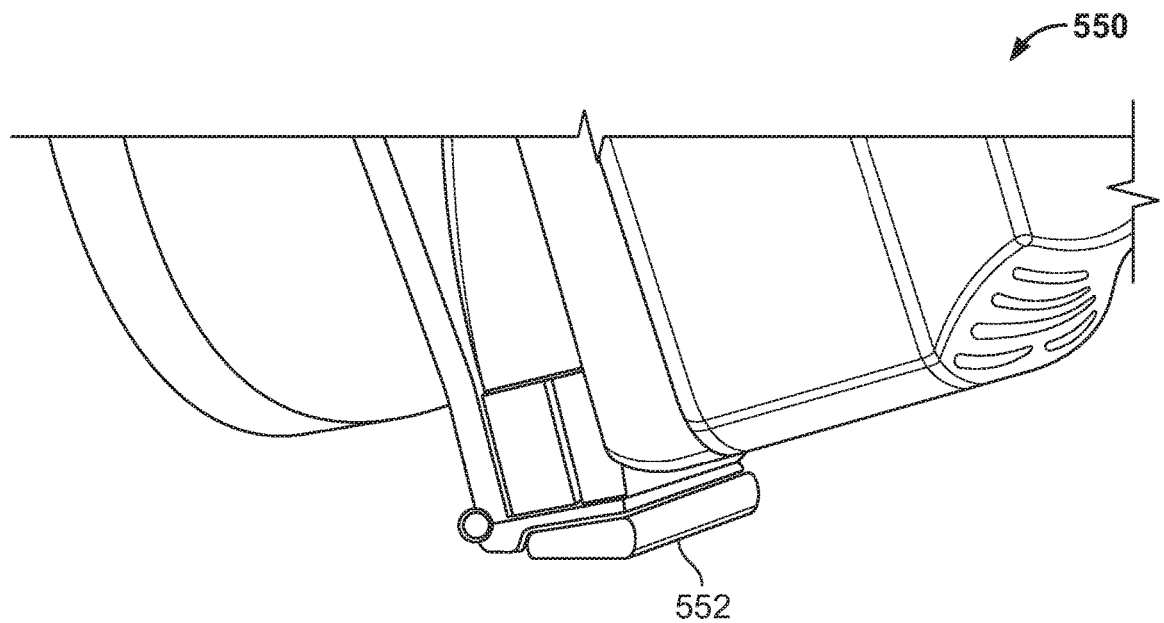
FIG. 5B is a focused view of a support element of the portable satellite terminal of FIG. 5A.

FIG. 5B is a focused view 550 of the support end block element 552 and/or 510 of the portable satellite terminal of FIG. 5A. As discussed above, the support end block element 552 together with the harness 506 and/or foldable struts from the back structure may form a tri-pod that allows operations on-the-pause. The support end block element 552 may provide cushioning for a terminal. The element 552 may provide robust and discrete support for a terminal at rest on a surface.

Figure 6A:
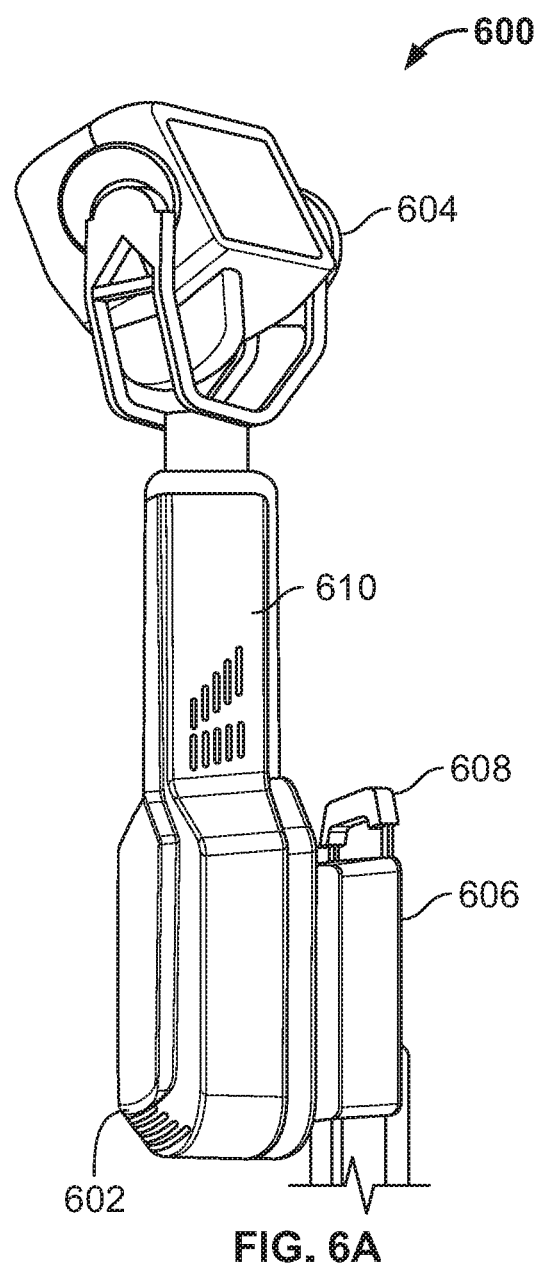
FIG. 6A is a view of the portable satellite terminal with its antenna assembly extended.

FIG. 6A is a view of the portable satellite terminal 600 with its antenna 604 extended and/or elevated while appropriately pointed towards a target satellite 102 or 104. The terminal 600 includes a lift and/or carry handle 608 arranged to enable user 112 to carry the terminal 600 via the handle 608 instead of via harness 506. The handle 608 may also enable user 112 to move the terminal 600 more conveniently or lift the terminal 600 and place the terminal 600 on the user's back via the harness 506. The handle 608 may enable easy user 112 handling and/or access to terminal 600, for example, when mounting and dismounting it. The handle 608 may be configured ergonomically to enable more efficient gripping via a bare or gloved hand. The handle 608 may be arranged to provide sufficient clearance for a gloved hand. The handle 608 may include material such as, without limitation, rubber, metal, and/or plastic. The handle 608 may include wear resistant and/or hard wearing material for on-the-move or outdoor use.

The terminal 600 may include a tower 610 that may provide physical separation between the antenna 604 and other components of the terminal 600. The terminal 600 may include a motor such as motor 204 to enable the antenna 604 to be positioned to point toward a selected satellite such as satellite 102 or 104. The antenna 604 may include a housing for a satellite antenna and one or more motors, e.g., servomotors, that are arranged to tilt the antenna 604 in at least one of a horizontal and vertical direction to enable the terminal 600, via a controller such as computer 210, to point the antenna 604 toward a selected satellite 102 or 104. The tower 610 may include one or more air outlets to enable air cooling of terminal 600 components.

Figure 6B:
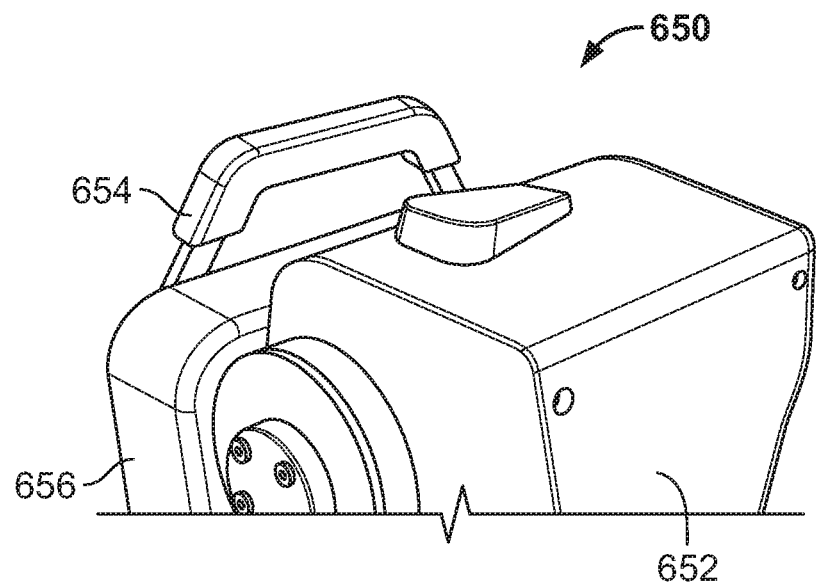
FIG. 6B is a focused view of a lift and/or carry handle of the portable satellite terminal.

FIG. 6B is a focused view 650 of a padded lift and/or carry handle 654 of the portable satellite terminal 600. The handle 654 may be connected to and/or integrated with a slide element, rail element, and/or linear unit 656 that enables the antenna 652 to be elevated and/or extended (or retracted).

Figure 6C:
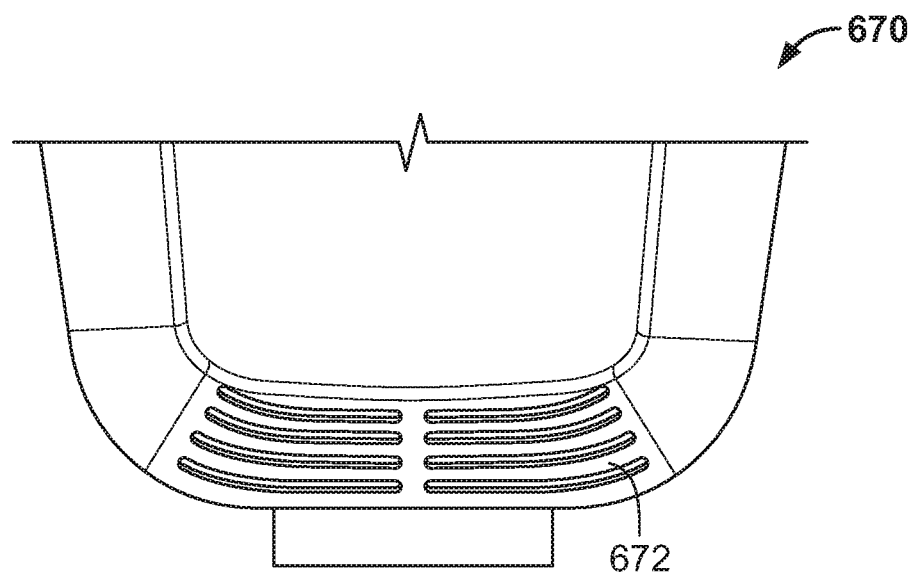
FIG. 6C is a focused view of an air inlet of the portable satellite terminal.

FIG. 6C is a focused view 670 of an air inlet 672 of the portable satellite terminal 600 to provide ventilation for components of terminal 600.

In operation, terminal 600 may be configured for personal carry use, which is the most challenging method of use. In other instances, two other use cases (on-the-pause and vehicle mounted on-the-move) may enable variants of mounting methods and a built-in tri-pod functionality. For personal carry operations, the terminal and/or unit 600 may be configured to be light weight and simple to use. Typically, for existing gimbal technology available off-the-shelf, simple and light weight stabilized platforms are not sufficiently accurate, providing a miss-pointing on the order of 1-2 degrees from the target direction (i.e., a target satellite). As a result, the antenna pointing for existing systems must, by necessity, be stable enough to maintain the link signal-to-noise ratio within a sufficient margin.

Figure 7:
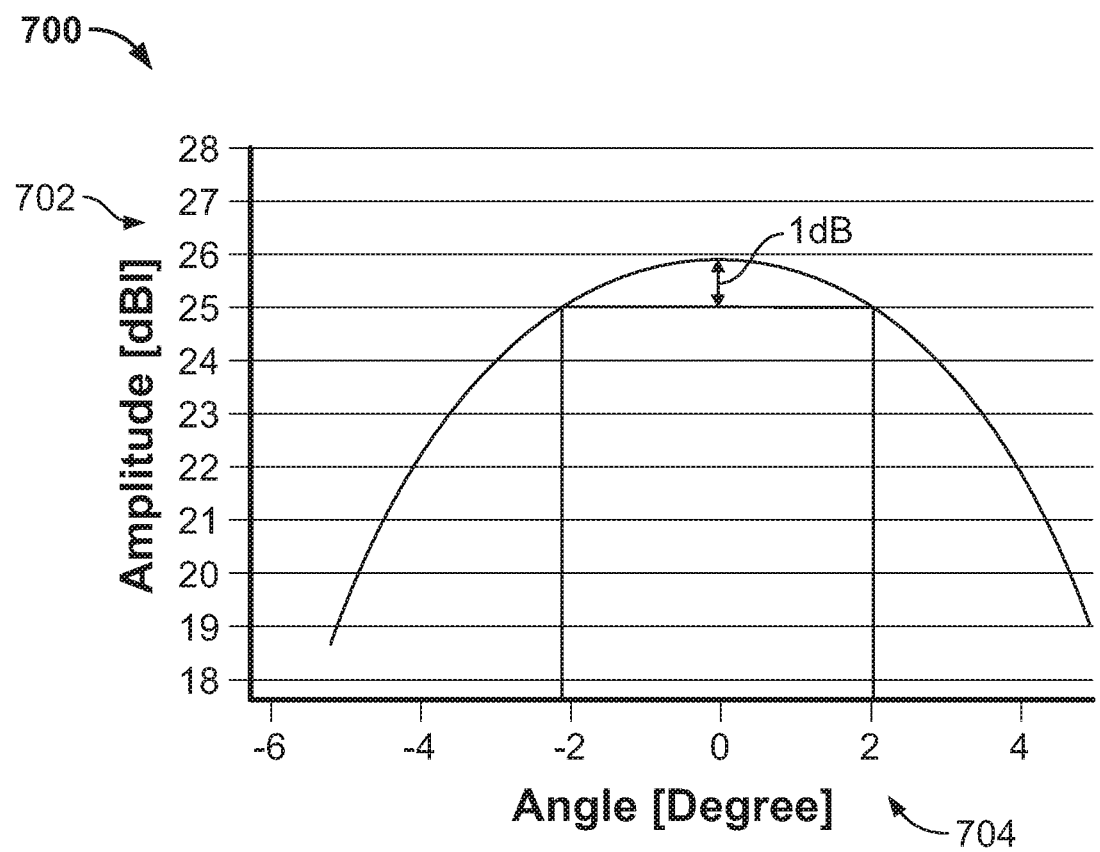
FIG. 7 is a chart illustrating the beam characteristics of a parabolic antenna.

FIG. 7 is a chart 700 illustrating the beam characteristics of a parabolic antenna. Antenna 202 may include a parabolic antenna and/or a flat panel antenna. The chart 700 shows satellite signal amplitude 702 versus angle 704 in degrees. In some implementations, the terminal 600, 200, and/or 106 is configured with a maximum link degradation of approximately 1 dB. FIG. 7 shows as an example a simple model of the antenna beam based on a parabolic reflector system. At 13 GHz, with a 0.2 m diameter and an antenna efficiency of 53.5%, the antenna gain has dropped by 1 dB at 2 degree miss-pointing, which indicates that any antenna system with similar performance may be a viable antenna for the present system. For integration, space limitations, and geometric reasons, a flat panel antenna of approximately the same aperture size (~0.2 m) may be the most advantageous antenna for use and/or integration.

An antenna, for example, with beam characteristics of a parabolic antenna model at 13 GHz, an antenna diameter of 0.2 m, and an aperture efficiency of 53.5% that is mounted on a stabilized platform with a pointing accuracy of +/−2 degrees will, after initial pointing towards the satellite, keep the link signal-to-noise ratio within the desired 1 dB.

When its antenna 202 is in a stowed, non-elevated position, the terminal 600, 200, and/or 106 may be visible on the user's back or completely contained in a backpack. The antenna 604, tower 610, and body 602 may be arranged to provide a stabilized platform for the antenna 202. An antenna assembly may include the stabilized platform or a portion thereof. The stabilized platform and/or antenna assembly may be attached to a linear unit 656 integrated in the harness and may be elevated from behind the user's back using either an automatic elevator motor mechanism or by a manual elevator mechanism including, for example, a quick release for emergency stow. The automatic elevator and/or retractor mechanism may be controlled via a smartphone application or a dedicated remote control either through, without limitation, Wifi, Bluetooth, a mobile network, or via a cable, and/or via transceiver 206.

In its elevated position, the antenna 604 and/or antenna assembly that transmits the radio frequency power towards the satellite 102 or 104 extends above the user's head to give a free line of sight towards the satellite 102 or 104. In this instance, user 112 is able to walk, run, jump or crawl without losing signal lock as long as the antenna assembly and/or stabilized platform is elevated and maintains the pointing direction.

In certain operations, the terminal 600, 200, and/or 106 is programmed with control software arranged to continuously track a satellite signal and maintain the pointing direction such that the satellite signal maintains a signal gain according to the model of FIG. 7. The control software may use data obtained from one or more sensors 212 to maintain sufficient pointing directions towards the satellite 102 or 104. The terminal 600, 200, and/or 106 may use one or more accelerometers, gyroscopes and magnetometers. The computer 210 and/or dedicated electronics within a terminal 600, 200, and/or 106 may be equipped with a feedback mechanism that, once the terminal 600, 200, and/or 106 gets a signal lock, continuously optimizes the received signal-to-noise ratio via, for example, a conical scan or similar algorithm. The software may also include a safety and/or radiation hazard analysis function or loop to ensure that the radiation emitted from the antenna 202 will not expose the user 112 or anyone in proximity of the terminal to elevated or dangerous radio radiation levels.

Figure 8:
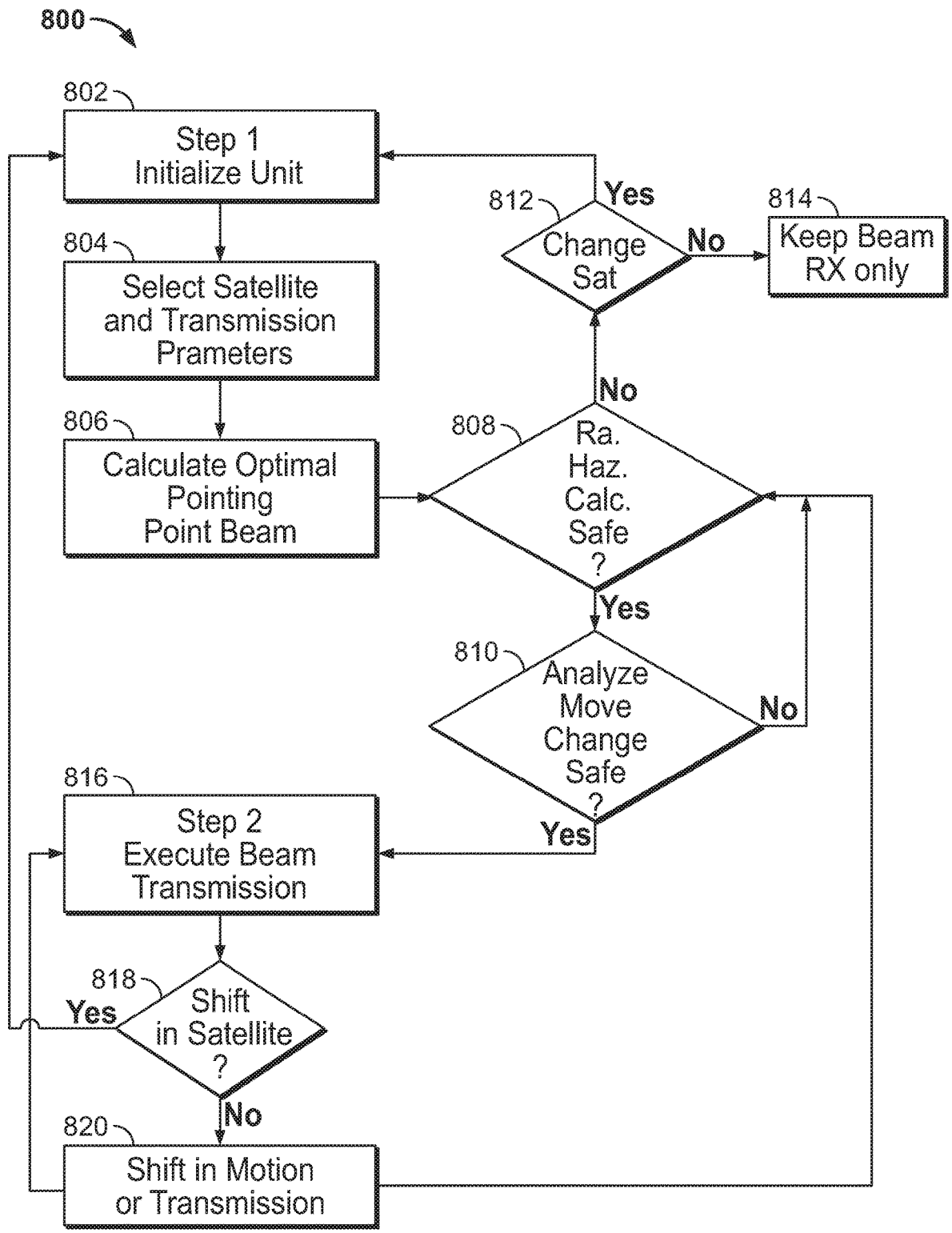
FIG. 8 is a flow diagram of a process for controlling a portable satellite terminal.

FIG. 8 is a flow diagram of a process and/or control loop 800 for controlling a portable satellite terminal such as terminal 600, 200, and/or 106. On initial power up of terminal 600, 200, and/or 106, various components of the terminal will be initialized such as, for example, computer 210, modems 206 and 208, one or more sensors 212, and one or more motors 204. (Step 802). During initialization, control software may be booted up and checked by computer 210, the operation and/or position of servomotors may be checked, the received signals of modems 206 and 208 may be checked, and so on. After initialization, the terminal 600, 200, and/or 106, via a controller and/or computer 210, will select a satellite 102 or 104 and configure transmission parameters for a communications link with the selected satellite 102 or 104. (Step 804). In some implementations, user 112 may indicate, via a user interface, to the terminal 106 which satellite 102 or 104 to select. In some implementations, the terminal 106 may automatically select satellite 102 or 104 based on the terminal location that may be determine via GPS and/or another location detection technique. The terminal 106 may search for a satellite signal of sufficient strength to select satellite 102 or 104.

Once a satellite 102 or 104 is selected, the controller and/or computer 210 calculates an optimal pointing configuration of satellite antenna 202. (Step 806). In one implementation, the controller 210, in communication with the RF interface, modem, and/or satellite transceiver 208 is, arranged to: i) measure a gain associated with received satellite signals during a first time interval, ii) receive a detected position and orientation of the directional antenna 202, via one or more position or orientation sensors, during the first time interval, and iii) send a control signal to one or more electronic motors 204 to adjust the position and orientation of the directional antenna 202 and/or antenna assembly to maximize a received bean signal strength and/or to limit a decrease in the measured gain to less than a threshold. In some implementation, the position and orientation of the directional antenna 202 is adjusted by adjusting, via one or more servomotors, a tilt of the antenna 202 in both or either horizontal and vertical directions. The first time interval may depend on a detected rate of movement of the terminal 106. For example, a sensor 212 including an accelerometer may detect whether the terminal is stationary or moving. If stationary, the controller 210 would not have to check for a change in position of a satellite, at least as often as if the terminal 106 were moving. Hence, the first time interval duration can be longer for stationary or slower moving terminals than faster moving terminals that should check the satellite position more frequently.

The controller 210 may then check, via one or more proximity sensors located in, near to, or on the terminal 106, whether user 112 or another person is within proximity of the beam path of the antenna 202. Depending on the detected position of user 112 and/or another person, and based on an expected power output of transceiver 208, controller 210 determines whether the RF radiation exposure level is safe to user 112 and/or another person. (Step 808). If the expected exposure level is at or above an RF radiation threshold or limit based on the detected position of user 112 or another person, controller 210 may calculate whether a change in the position and/or orientation of antenna 202 and/or a change in power output of antenna 202 will result in an exposure level below the RF radiation limit.

If a safe level can be achieved by changing the power output or pointing of antenna 202, then the antenna position and/or orientation, and/or power output will be changed accordingly. In certain implementations, any change in pointing and/or power output will also satisfy the gain requirements of a model such as required, for example, in FIG. 7. If the expected exposure level is safe, then no change in position and/or orientation, and/or change in power output is required. (Step 810). Steps 808 and 810 may be repeated one or more times until a safe antenna 202 pointing and/or power output level is realized.

If a safe amount of radiation exposure cannot be achieved after one or more attempts, controller 210 may change the satellite link to another satellite. (Step 812). The steps of 802 through 810 may then be repeated with respect to the newly selected satellite. If the satellite is not changed, then controller 210 may keep transceiver 208 in a receiver (RX) mode only to maintain reception of satellite data while preventing potentially hazardous radiation from beam transmissions.

Once the requirements of optimal pointing and/or radiation hazard safety are satisfied, controller 210 executes satellite beam transmission via satellite transceiver 208. (Step 816). The controller 210 may continuously monitor the received satellite signal to maintain the gain within an acceptable range such as, for example, based on the model of FIG. 7. If controller 210 detects a shift in the relative position of a satellite such as satellite 102 by, for example, detecting a reduction in amplitude of the receive satellite data signal, controller 210 may return to Step 802 or 804 to establish a new communications link with the previous satellite 102 or a new satellite 104. (Step 818).

If the controller 210 detects a shift in transmission or shift in motion of the terminal 106, user 112, or another person, the controller 210 may initiate a radiation hazard check according to Step 808 and/or 810 (Step 820).

It will be apparent to those of ordinary skill in the art that methods involved in the systems and methods herein may be embodied in a computer program product that includes a non-transitory computer usable and/or readable medium. For example, such a computer usable medium may consist of a read only memory device, such as a CD ROM disk, conventional ROM devices, or a random access memory, a hard drive device or a computer diskette, a flash memory, a DVD, or any like digital memory medium, having a computer readable program code stored thereon.

The terminal 600, 200, and/or 106 may include an inertial navigation system, an accelerometer, an altimeter, a gimbling system to fixate one or more components of the terminal (e.g., one or more antennae), a global positioning system (GPS), or any other suitable location and/or navigation system.

The fully contained terminal and/or system (indoor and outdoor unit) may be carried on the user's back, either as a standalone system or integrated in a backpack. The terminal may also be positioned on the ground or another surface while maintaining communications with one or more satellites.

In certain implementations, the terminal and/or system has a directional antenna that is mounted on a stabilized gimbal platform. In one configurations, the system has ability to function on the back of a person, as an on-the-pause satcom terminal and/or also as a unique on-the-move terminal with a smart built-in tri-pod and vehicle mount system such as, for example, a magnetic quick and/or mechanical click on system for an automobile roof mount. When carried on the back, it may allow for communications while on a bike, motorbike, snowmobile, water jet ski, motor boat, and/or similar vehicles.

From antenna 202 and radio frequency amplifier or transceiver 208, terminal 600, 200, and/or 106 may keep track of the personal radiation hazard aspects which depends on the power levels emitted in the different directions and the current geometry which may be tracked from inbuilt sensors 212 in, on, near, or about terminal 600, 200, and/or 106.

The stabilized platform, which may include components 602, 604, and 610, may be attached to a linear unit 606 and elevated from behind the user's back using an electric motor or mechanical drive mechanism that is controlled either manually or by a wireless or wired remote control. The platform may also be elevated manually.

In its elevated position, the platform and/or antenna assembly may perform an automatic scan of the visible sky to find the desired satellite 102 or 104. The user 112 may also manually (via the remote control or a user interface) control the pointing of the antenna 202 in order to find the satellite 102 or 104, or fine-tune the pointing.

The antenna 202 pointing may be maintained through the use of accelerometers, gyroscopes and magnetometers. The system and/or terminal 600, 200, 106 may be equipped with a feedback mechanism that, once the system gets a signal lock, optimizes the received signal-to-noise ratio via a conical scan or similar algorithm. While the system is in an elevated position, the user may walk, run, jump or crawl without losing signal lock.

The wireless device transceiver 206 may include a Wifi module or similar that sets up a network bubble around the main user 112, allowing wireless devices 114, 116, and/or 118 within the wireless bubble or coverage area to access the satellite services. In a military context, the system and/or terminal may be connected to a handheld radio such that a group of soldiers via the satellite link can expand their radio network to, and communicate with, other groups that also carry the same system but are located beyond line of sight.

When the communication link is no longer needed, user 112 may lower the platform and/or antenna 604 into its stowed position via a remote control. The platform may also be lowered manually.

Various features and techniques described herein may include features and techniques as described in U.S. Pat. No. 8,248,318, the entire contents of which are incorporated herein by reference.

What is claimed is:

1. A satellite communications apparatus comprising:
an antenna assembly including:
  a directional antenna arranged to receive signals from and transmit signals to a satellite;
  an electronic motor arranged to adjust at least one of a position and orientation of the directional antenna;
  a sensor arranged to detect the position and orientation of the directional antenna;
  an RF interface, in communication with the antenna, arranged to receive the received signals from the directional antenna;
  a controller, in communication with the RF interface, arranged to: i) measure a gain associated with the received signals during a first time interval, ii) receive the detected position and orientation of the directional antenna during the first time interval, and iii) send a control signal to the electronic motor to adjust the position and orientation of the directional antenna to limit a decrease in the measured gain to less than a threshold.

2. The apparatus of claim 1, wherein the gain includes at least one of a power gain and amplitude gain.

3. The apparatus of claim 1, wherein the threshold is equal to or about one of 0.25 dB, 0.5 dB, 1 dB, 2 dB, 3 dB, 4 dB, and 5 dB.

4. The apparatus of claim 1, wherein the electronic motor includes a servomotor.

5. The apparatus of claim 1, wherein the antenna assembly includes a stabilized platform.

6. The apparatus of claim 1, wherein the antenna assembly is configured to provide pointing accuracy of one of about +/−1 degree, +/−2 degrees, +/−3 degrees, +/−4 degrees, and +/−5 degrees.

7. The apparatus of claim 1, wherein the apparatus is configured to be carried by a user.

8. The apparatus of claim 1, wherein the directional antenna is extendable away from the user.

9. The apparatus of claim 1, wherein the directional antenna is extendable to a distance sufficient to reduce RF radiation exposure to the user below a radiation limit.

10. The apparatus of claim 1, wherein the controller is configured to adjust the at least one of the power output from the RF interface and the position and orientation of the directional antenna based on a presence of a person in proximity to the directional antenna.

11. The apparatus of claim 1, wherein the time interval is equal to or about one of 1 ms, 50 ms, 100 ms, 0.5 seconds, 1 second, 2 seconds, 5 seconds, 10 seconds, 30 seconds, 1 minute, 5 minutes, 10 minutes, and 1 hour.

12. The apparatus of claim 11, wherein the duration of the time interval is based at least in part on a detected rate of movement of the terminal.

13. A method for satellite communications comprising:
providing an antenna assembly;
configuring a directional antenna to receive signals from and transmit signals to a satellite;
adjusting an electronic motor to adjust at least one of a position and orientation of the directional antenna;
detecting the position and orientation of the directional antenna;
receiving the received signals from the directional antenna;
measuring a gain associated with the received signals during a first time interval;
receiving the detected position and orientation of the directional antenna during the first time interval; and
sending a control signal to the electronic motor to adjust the position and orientation of the directional antenna to limit a decrease in the measured gain to less than a threshold.

14. The method of claim 13, wherein the gain includes at least one of a power gain and amplitude gain.

15. The method of claim 13, wherein the threshold is equal to or about one of 0.25 dB, 0.5 dB, 1 dB, 2 dB, 3 dB, 4 dB, and 5 dB.

16. The method of claim 13, wherein the electronic motor includes a servomotor.

17. The method of claim 13, wherein the antenna assembly is configured to provide pointing accuracy of one of about +/−1 degree, +/−2 degrees, +/−3 degrees, +/−4 degrees, and +/−5 degrees.

18. The method of claim 13 comprising extending the directional antenna to a distance sufficient to reduce RF radiation exposure to the user below a radiation limit.

19. The method of claim 13 comprising adjusting at least one of the power output and the position and orientation of the directional antenna based on a presence of a person in proximity to the directional antenna.

20. A non-transitory computer readable medium containing program instructions for causing a computer to perform the method of:
- configuring a directional antenna to receive signals from and transmit signals to a satellite;
- adjusting an electronic motor to adjust at least one of a position and orientation of the directional antenna;
- detecting the position and orientation of the directional antenna;
- receiving the received signals from the directional antenna;
- measuring a gain associated with the received signals during a first time interval;
- receiving the detected position and orientation of the directional antenna during the first time interval; and
- sending a control signal to the electronic motor to adjust the position and orientation of the directional antenna to limit a decrease in the measured gain to less than a threshold.

* * * * *